Dec. 12, 1967 G. J. TILL ET AL 3,357,231
WIND SPEED TEST SYSTEM
Filed July 23, 1965
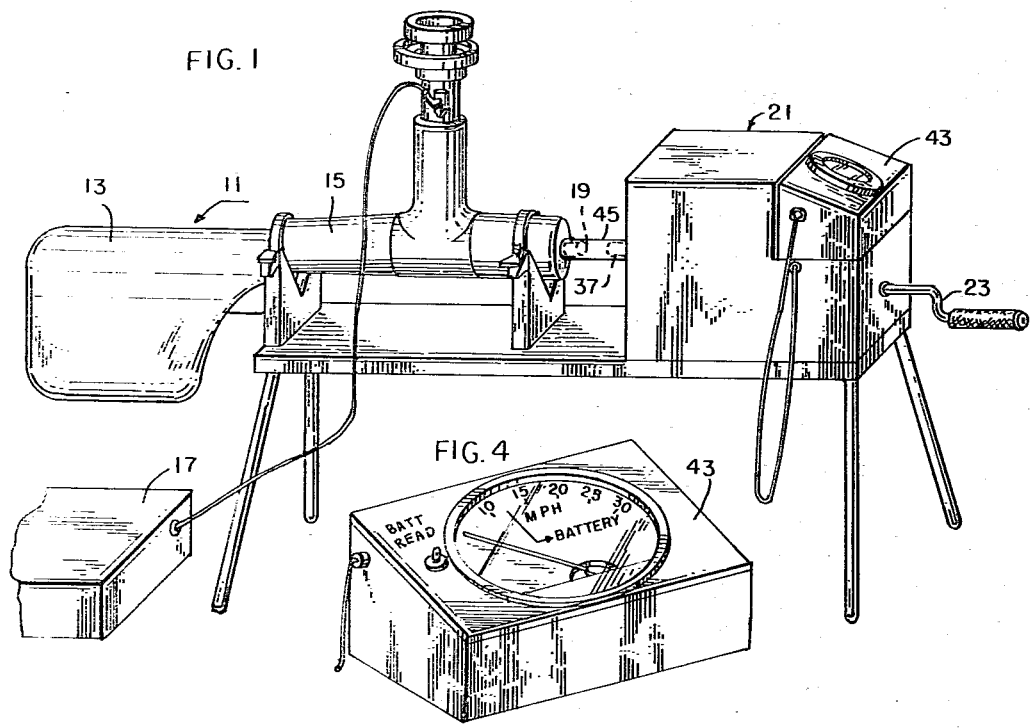
FIG. 1
FIG. 4
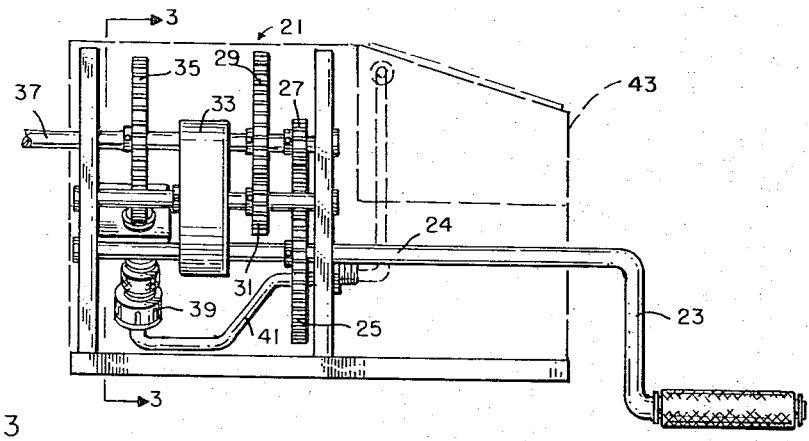
FIG. 2
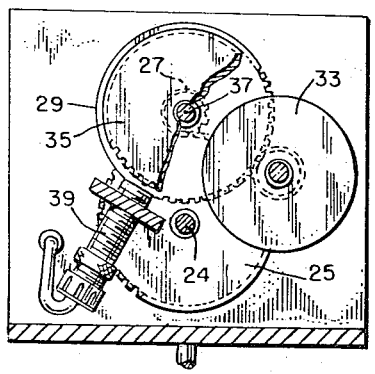
FIG. 3
INVENTORS,
GILBERT J. TILL
THOMAS J. TALAROVICH
BY Harry M. Sarogarty,
Edward J. Kelly, Herbert Berl
& Julian C. Keppler
ATTORNEYS 3,357,231
WIND SPEED TEST SYSTEM
Gilbert J. Till, 1012 Burnt Tavern Road, Point Pleasant, N.J. 08742, and Thomas J. Talarovich, 843 Main St., Freeland, Pa. 18224
Filed July 23, 1965, Ser. No. 474,527
1 Claim. (Cl. 73—3)

ABSTRACT OF THE DISCLOSURE

This invention relates to a system for checking and testing the accuracy of the readings of an indicator meter forming part of a wind indicating instrument. The system includes a wind speed simulator having a tachometer that is calibrated to indicate the true wind speed which is coupled to a wind indicating instrument for comparing such calibrated indication against the readings of the wind indicator device to check the accuracy thereof.

---

The invention described herein may be manufactured and used by or for the Government for governmental purposes without the payment of any royalty thereon.

Wind velocity and wind direction are critical factors in many military and commercial operations. In areas such as ballistics, rocketry, meteorological tests of all types and airfield control, it is necessary that an exact determination of the wind velocity and direction be available at all times. For this purpose there have been provided various forms of wind measuring equipments to make available such information. One such widely used instrument comprises essentially a bladed impeller at one end of the device, a vane at its other end, an intermediate body portion which includes means for converting the mechanical movements of the impeller and the vane to electrical measurements which can be read on an indicator meter. However, it has been found that in many instances true and accurate readings of wind velocity did not register correctly in the indicator meter possibly due to a variety of reasons. One such reason may be a malfunctioning of the indicator meter which may be occasioned by the entrance of dirt or dust into the indicator meter. Minor or slight damage to any of the component parts within the indicator meter may also cause an inaccurate reading of the true wind velocity. Such inaccuracies may cause a serious deviation in the practice of any art where a true reading of wind velocity is a prime factor.

The primary object of the present invention is to provide means for checking and testing the accuracy of the readings of the indicator meter that are part of the wind indicating instruments by providing a wind speed simulator wherein the true speed of the wind velocity is available, and checking such indication or reading against the reading on the indicator meter of the wind indicating equipment to determine if such latter reading is true and accurate.

The invention can best be understood from the following description read in view of the accompanying drawing in which:

FIG. 1 is a view in perspective of a wind speed transmitter, less the impeller, its associated indicator meter and the wind speed simulator of the present invention.

FIG. 2 is a cross sectional view of the wind speed simulator of the present invention.

FIG. 3 is a view taken on the line 3—3 of FIG. 2, and

FIG. 4 is a plan view of the tachometer that is part of the wind speed simulator.

Referring to the drawing, there is shown in FIG. 1 one type of wind speed transmitter designated generally as 11 which includes, in part, a vane 13 and a central body portion 15 and an indicator meter 17. As shown in FIG. 1 the wind speed transmitter 11 is in "up-side-down" position since it is easier to mount the transmitter in such position on a table as shown. Extending axially from the body portion 15 of the transmitter is a shaft 19 upon which may be mounted an impeller (not shown). In its conventional usage the impeller will rotate at a speed dependent upon the wind velocity and the rotation of shaft 19 is converted to a reading on the indicator meter to wind velocity in miles per hour. As heretofore indicated such reading may not be true due to some failure or malfunction within the mechanism of body portion 15 and/or the indicator meter 17.

To determine if such inaccuracies exist in the indicator meter readings there is provided a wind simulator and comparer of the following kind. Reference is directed to FIG. 2 which portrays a cross sectional view of the wind simulator contained within a housing 21. Confined within the housing and extending therefrom is a crank handle 23. Within the housing the extension 24 of the crank handle constitutes the initial shaft of a gear train which includes spur gears 25, 27, 29, 31 and a flywheel 33. All of the spur gears heretofore mentioned, and the flywheel 33 are made of a non-ferrous material such as brass. Completing the gear train described is a spur gear 35 made of a ferrous material such as cast iron. From the arrangement of the gears as shown it is apparent that the driving gear will effect rotation of gear 27, shaft 37, and the cast iron spur gear 35. At the same time gears 29, 31 and flywheel 33 will be rotated. The gear 35 is revolvable with the shaft 37, the said same shaft that carries gears 27 and 29.

Also contained in the housing 21 and positioned in substantial intimate contact with the cast iron gear 35 is a magnetic pickup 39, a device which is a sensitive transducer that translates the movement of ferrous objects into a variable and measurable A.C. voltage which is proportionate to the rate of the objects, movement, such as the rotational speed of a gear, etc. The clearance between the ferrous gear 35 and the magnetic pickup 39 is approximately .006". To the magnetic pickup 39 is affixed a cable 41 that is linked to a tachometer 43, such as shown in FIG. 4. It can be seen that the tachometer 43 has a scale reading that indicates wind speed or velocity in the range of 10–30 miles per hour.

The teeth of the ferrous gear 35 are so spaced about the gear to act in concert with the magnetic pickup 39 so that at a fixed predetermined rotational speed of the gear 35 there will be produced a measurable A.C. voltage which will be a true indication of wind velocity of the wind speed indicator 11. The output of the magnetic pickup is rectified in a conventional rectifier 40, and the rectified output is measured on the tachometer. The linkage between the wind speed indicator and the wind speed simulator just described is accomplished by means of a flexible tubing 45, such as of rubber, that links the shaft 19 of the wind speed indicator 11 and the shaft 37 that carries the ferrous gear 35. It is thus apparent that the shafts 19 and 37 will rotate at the same speed and the measured output of each of said shafts will be shown in the indicating meter 17 and tachometer 43 respectively.

The wind speed transmitter 11 is so calibrated that known shaft speeds can be read on the meter 17 as specific wind speeds. Thus shaft speeds at 600 r.p.m.=30 m.p.h. wind; 500 r.p.m.=25 m.p.h. wind; 400 r.p.m.=20 m.p.h. wind.

In the utilization of the comparator described herein the handle 23 is rotated to effect a rotational speed of say 500 r.p.m. to the shaft 37, tubing 47 and shaft 19. The magnetic pickup 39 acting in concert with gear 35 will effect a true reading of 25 m.p.h. wind on the tachometer 43. At the same time there will be indicated on the indicator meter 17 a reading of the output of the wind indicating instrument 11. If such reading on the indicator meter reads, for example 21 m.p.h. wind, it will be readily evident that such reading is not true and that some fault lies in the indicator meter 17.

What is claimed is:

Means for testing the accuracy of a wind speed indicating device which includes an impeller mounted on a shaft forming part of said wind speed indicating device and an indicating meter that registers in wind speed of miles per hour caused by the rotational speed of said impeller shaft; said means comprising a wind speed simulator that includes a manually operated rotatable shaft, a tachometer and means for indicating on said tachometer a simulated wind speed including a revolvable ferrous gear secured to the last mentioned shaft and an electro-magnetic pickup device slightly spaced from said ferrous gear whereby the magnetic field created by said magnetic pickup is distorted by movement of said ferrous gear to generate an A.C. voltage and which is rectified to be read on said tachometer in wind speed of miles per hour and further including a coupling means between the respective shafts of said wind indicating device and said shaft supporting said ferrous gear whereby mutual rotation of said shafts is effected.

References Cited
UNITED STATES PATENTS

| | | | |
|---|---|---|---|
| 2,425,289 | 8/1947 | Ward | 73—2 |
| 3,131,561 | 5/1964 | Romanowski | 73—229 |

LOUIS R. PRINCE *Primary Examiner.*

S. C. SWISHER, *Assistant Examiner.*